(12) United States Patent
Wecker et al.

(10) Patent No.: US 6,449,638 B1
(45) Date of Patent: Sep. 10, 2002

(54) CHANNEL DEFINITION ARCHITECTURE EXTENSION

(75) Inventors: Dave Wecker, Bothell; David Tuniman, Redmond, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/107,941

(22) Filed: Jun. 30, 1998

Related U.S. Application Data
(60) Provisional application No. 60/070,720, filed on Jan. 7, 1998, and provisional application No. 60/075,123, filed on Feb. 13, 1998.

(51) Int. Cl.[7] ............................. G06F 15/16; G06F 9/00
(52) U.S. Cl. ...................................... 709/217; 709/317
(58) Field of Search ................................ 709/216, 217, 709/218, 219, 223, 238, 317, 318, 328; 707/10

(56) References Cited

U.S. PATENT DOCUMENTS

| | | | |
|---|---|---|---|
| 4,593,155 A | | 6/1986 | Hawkins .................. 179/2 EA |
| 4,916,637 A | * | 4/1990 | Allen et al. .................... 706/11 |
| 5,014,345 A | | 5/1991 | Comroe et al. ............... 455/54 |
| 5,043,721 A | | 8/1991 | May ....................... 340/825.44 |
| 5,367,667 A | * | 11/1994 | Wahlquist et al. ............ 714/32 |
| 5,400,331 A | | 3/1995 | Lucak et al. ............... 370/85.1 |
| 5,559,800 A | | 9/1996 | Mousseau et al. ....... 370/85.13 |
| 5,603,025 A | * | 2/1997 | Tabb et al. .................... 707/2 |
| 5,619,615 A | * | 4/1997 | Pitchaikani et al. .......... 706/10 |
| 5,619,694 A | * | 4/1997 | Shimazu .................... 707/104 |
| 5,623,656 A | * | 4/1997 | Lyons ......................... 707/10 |
| 5,640,590 A | * | 6/1997 | Luther ........................ 345/302 |
| 5,675,780 A | * | 10/1997 | Plant-Mason et al. ......... 707/6 |
| 5,675,831 A | * | 10/1997 | Caputo ....................... 710/10 |
| 5,680,585 A | * | 10/1997 | Bruell .................... 395/500.47 |
| 5,701,451 A | * | 12/1997 | Rogers et al. ................. 707/1 |
| 5,705,995 A | | 1/1998 | Laflin et al. ........... 340/825.44 |
| 5,740,549 A | | 4/1998 | Reilly et al. ................. 705/14 |

(List continued on next page.)

FOREIGN PATENT DOCUMENTS

| | | |
|---|---|---|
| EP | 0 653 736 A1 | 5/1988 |
| EP | 0 434 231 A2 | 6/1991 |
| EP | 0 704 827 A1 | 3/1996 |
| EP | 0 803 825 A | 10/1997 |
| WO | WO 90/13213 | 1/1990 |
| WO | WO 97/35402 | 3/1996 |
| WO | WO 97/17682 | 10/1996 |

OTHER PUBLICATIONS

Castedo Ellerman, "Channel Definition Format (CDF)", Channel Definition Format Submission 970309, Mar. 10, 1998, XP002103294.

Jason Levitt, "Push Your Web Pages—Netscape's Netcaster and Microsoft's CDF make it easier than ever to join the push revolution", Information Week, No. 634, Jun. 9, 1997, XP002103295.

(List continued on next page.)

Primary Examiner—Zarni Maung
Assistant Examiner—Jason D. Cardone
(74) Attorney, Agent, or Firm—Westman, Champlin & Kelly, P.A.

(57) ABSTRACT

A method for rendering information, such as, available through the Internet on a computer includes storing a content structure file, a data file and a script file. The data file includes data indicative of the information and the script file includes script information indicative of a desired form in which the data is to be rendered. The content structure file, data file and script file are independently receivable by the computer. The content structure file is read to ascertain which script in the script file is associated with data to be rendered. The data from the data file is retrieved and the associated script file is executed to render the data. Instructions can be provided on a computer readable medium to implement the method.

24 Claims, 8 Drawing Sheets

U.S. PATENT DOCUMENTS

| | | | | |
|---|---|---|---|---|
| 5,754,242 A | * | 5/1998 | Ohkami | 348/441 |
| 5,796,952 A | * | 8/1998 | Davis et al. | 709/224 |
| 5,799,151 A | | 8/1998 | Hoffer | 395/200.34 |
| 5,809,247 A | * | 9/1998 | Richardson et al. | 709/218 |
| 5,861,883 A | * | 1/1999 | Cuomo et al. | 345/326 |
| 5,875,306 A | * | 2/1999 | Bereiter | 709/220 |
| 5,884,097 A | * | 3/1999 | Li et al. | 710/43 |
| 5,903,262 A | * | 5/1999 | Ichihashi et al. | 725/136 |
| 5,905,856 A | | 5/1999 | Offensooser | 395/183.14 |
| 5,920,696 A | * | 7/1999 | Brandt et al. | 709/218 |
| 5,923,738 A | | 7/1999 | Cardillo, IV et al. | 379/93.25 |
| 5,933,826 A | * | 8/1999 | Ferguson | 707/9 |
| 5,935,060 A | | 8/1999 | Iliff | 600/300 |
| 5,937,041 A | * | 8/1999 | Cardillo, IV et al. | 379/93.25 |
| 5,943,486 A | | 8/1999 | Li | 395/685 |
| 5,946,326 A | | 8/1999 | Rinne | 370/486 |
| 5,953,523 A | * | 9/1999 | Martinez et al. | 395/701 |
| 5,953,524 A | * | 9/1999 | Meng et al. | 717/1 |
| 5,963,944 A | | 10/1999 | Adams | 707/10 |
| 5,974,085 A | | 10/1999 | Smith | 375/222 |
| 5,974,238 A | | 10/1999 | Chase, Jr. | 395/200.78 |
| 5,999,941 A | * | 12/1999 | Anderson | 707/103 |
| 6,041,183 A | | 3/2000 | Hayafune et al. | 395/712 |
| 6,061,698 A | * | 5/2000 | Chadha et al. | 707/513 |
| 6,078,743 A | * | 6/2000 | Apte et al. | 717/1 |
| 6,085,224 A | * | 7/2000 | Wagner | 709/203 |
| 6,112,242 A | * | 8/2000 | Jois et al. | 709/225 |
| 6,151,610 A | | 11/2000 | Senn | 707/516 |

OTHER PUBLICATIONS

Vitali, F. et al., "Exending HTML in a principled way with displets", Computer Networks and ISDN Systems, vol. 29, No. 8–13, Sep. 1, 1997, pp. 1115–1128, XP004095309.

Salampasis, M. et al., "Hyper Tree: A Structural Approach to Web Authoring", Software–Practice and Experience, vol. 27, No. 12, Dec. 1, 1997, pp. 1411–1426, XP000726053.

"Dynamic Documents: Mobile Wireless Access to the WWW", M. Frans Kaashoek, et al., *IEEE*, Dec. 8, 1994, pp. 179–184.

Oliverio, G., "A Paging HPC", Handheld Systems, Creative Digital Publishing Inc., (retrieved from Internet Jun. 10, 1999), No. 5.4, Jul. 1997–Aug. 1997, XP002106345.

Scardinal, M., "The PageCard SDK", Handheld Systems, Creative Digital Publishing Inc., (retrieved from Internet Jun. 10, 1999), No. 5.6, Nov. 1997–Dec. 1997, XP002106346.

"Minstrel Plus™" brochure, for Novatel Wireless, Inc. copyright 1998.

* cited by examiner

CHANNEL DEFINITION ARCHITECTURE EXTENSION

CROSS-REFERENCE TO RELATED APPLICATION

The present application is based on and claims the benefit of provisional patent application, Serial No. 60/070,720 filed on Jan. 7, 1998, and provisional application Serial No. 60/075,123 filed on Feb. 13, 1998.

BACKGROUND OF THE INVENTION

The present invention relates to personal mobile computing devices commonly known as mobile devices. More particularly, the present invention relates to a system and method for delivering and receiving information on a mobile device.

Mobile devices are small electronic computing devices often referred to as personal digital assistants. Many such mobile devices are hand held devices, or palm-size devices, which comfortably fit within the hand. One commercially available mobile device is sold under the trade name Hand-Held PC (or H/PC) having software provided by Microsoft Corporation of Redmond, Wash.

Generally, the mobile device includes a processor, random access memory (RAM), and an input device such as a keyboard and a display. The keyboard can be integrated with the display, such as where the keyboard is incorporated as a touch sensitive display. A communication interface is optionally provided and is commonly used to communicate with a desktop computer. A replaceable or rechargeable battery powers the mobile device. Optionally, the mobile device can receive power from an external power source that overrides or recharges the built-in battery.

In some prior applications, the mobile device is used in conjunction with a desktop computer. For example, the user of the mobile device may also have access to, and use, a desktop computer at work or at home, or both. The user typically runs the same types of applications on both the desktop computer and on the mobile device. Thus, it is quite advantageous for the mobile device to be designed to be coupled to the desktop computer to exchange information with, and share information with, the desktop computer.

Another technique for providing information to such mobile devices is through a wireless transmission link. Such information can include electronic mail or news, weather, sports, traffic and local event information. The information is typically obtained from a desktop computer connected to the Internet and delivered over a wired connection. However, it may be desirable to deliver such information over a wireless connection as well. A wireless receiver on the mobile device can act to receive information as it is being sent to the mobile device.

There is presently no reasonable way to deliver push style content (such as hypertext mark-up language (HTML) content provided on a global network such as the internet and world wide web) to such devices in a wireless manner and in an open and available architecture. The bit rate of conventional wireless channels is very low. Thus, the delivery of very large content (such as HDML content) is highly impractical.

One conventional type of approach to delivering such information is to rewrite the content into a device friendly format, such as HTML. The content is then obtained over a pull-style model. Another approach currently being used to deliver information via a wireless medium in a closed model. In a closed model, a content provider can only provide content which is written in a format suitable for receipt by a specific device implementing a specific type of software. This means that the vast majority of web content is unavailable for viewing on such devices.

SUMMARY OF THE INVENTION

A method for rendering information, such as, available through the Internet on a computer includes storing a content structure file, a data file and a script file. The data file includes data indicative of the information and the script file includes script information indicative of a desired form in which the data is to be rendered. The content structure file, data file and script file are independently receivable by the computer. The content structure file is read to ascertain which script in the script file is associated with data to be rendered. The data from the data file is retrieved and the associated script file is executed to render the data. Instructions can be provided on a computer readable medium to implement the method.

In one preferred embodiment, the content structure file includes references to data and scripts in a hierarchy. In particular, the content structure file includes script tags associated with the scripts in the script file wherein the script tags are arranged in the hierarchy. When the content structure file is read to ascertain which script in the script file is associated with the data to be rendered, the script is chosen as a function of the hierarchy. Organization of the script tags in a hierarchy allows tag inheritance. Specifically, if there is no associated script tag for the data in the lower portion of the hierarchy, a script referenced by a script tag in a higher portion of the hierarchy will be executed to render the data. In another embodiment, if a referenced script in the content structure file cannot be found in the script file, a default script is executed in order to render the data.

DETAILED DESCRIPTION OF THE PREFERRED EMBODIMENTS

Figure 1:
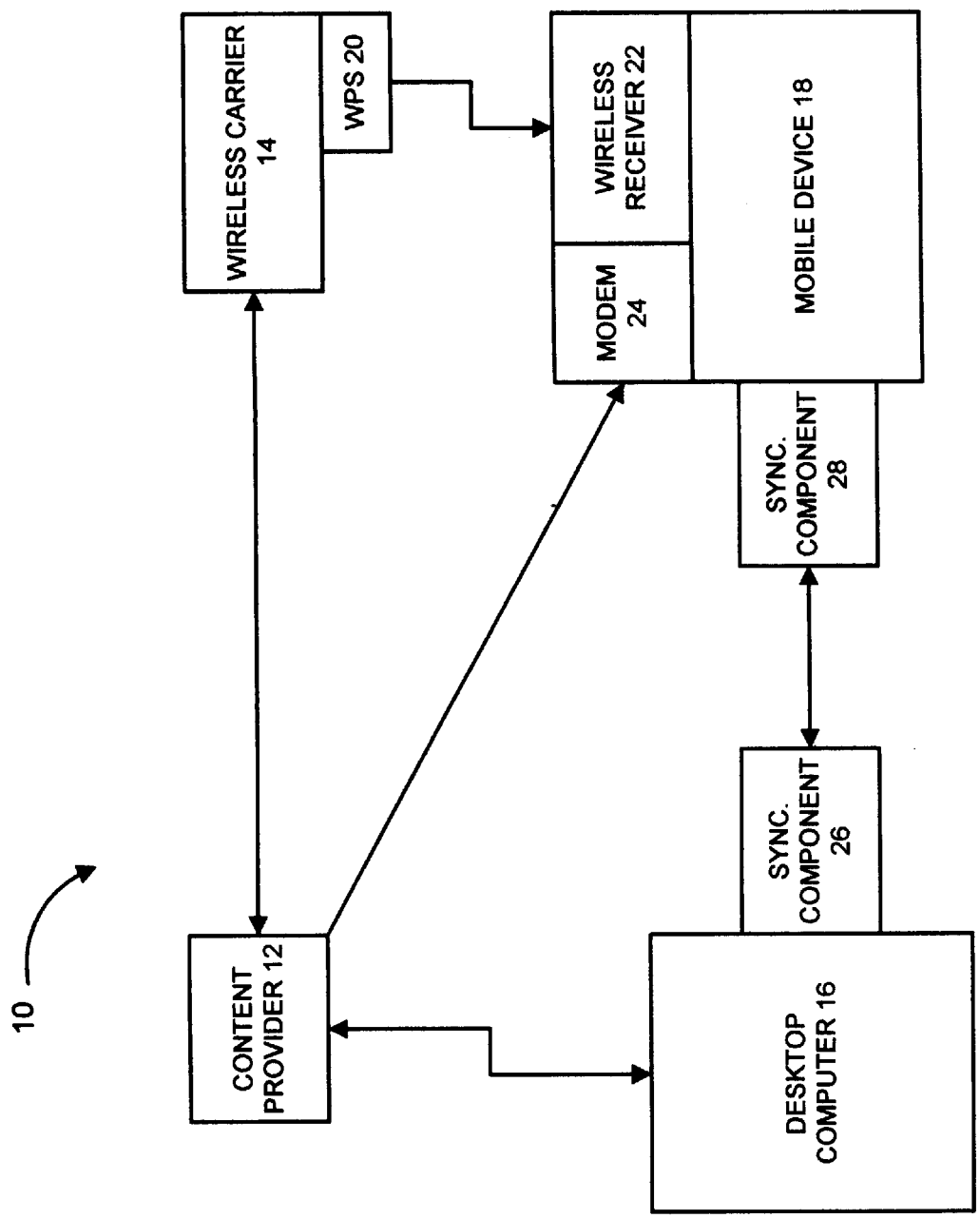
FIG. 1 is a simplified block diagram illustrating one embodiment of a mobile device in a system in accordance with the present invention.

FIG. 1 illustrates a system 10 in which the present invention is illustratively implemented. System 10 includes content provider 12, wireless carrier 14, desktop computer 16 and mobile device 18. Content provider 12 provides any suitable type of data from a database or other data source. For example, content provider 12 is discussed hereinafter as a provider of internet world wide web content. In the preferred embodiment, the content is provided in a standard format, such as HTML, JPEG, GIF, WAV, etc. The web content is also preferably described in a content structure file also known commonly as a channel definition format (CDF) file. A single portion of content (such as a web page or a web site) is referred to herein as a mobile channel.

A mobile channel is a self describing web site that contains all the information necessary for efficient download of web content to mobile device 18. Three components are provided in a preferable mobile channel. The components include a channel definition format (CDF) file, a set of script files to render the channel, and a set of data files to be rendered. The CDF files are described in greater detail below. Briefly, the CDF is an inventory of content contained on the mobile channel.

The script files contain script which defines templates which specify the appearance of the data on the screen of mobile device 18. Scripts are preferably written in visual basic script (VBS).

The data files correspond to one or more script files and include data which is indicative of the substantive content of the channel to be rendered. The data is packaged in small and simple text files. All of this information is used to define web content.

Operation of system 10 using separate script and data files is described in detail in co-pending U.S. patent application, Ser. No. 09/107,666, filed on Jun. 30, 1998, entitled "SYSTEM FOR DELIVERING DATA CONTENT OVER A LOW BIT RATE TRANSMISSION CHANNEL", and hereby incorporated by reference. Briefly, however, wireless carrier 14 is configured to receive web content from the web content provider 12 via dial-up or direct internet connection, or a network connection. Wireless carrier 14 also includes a wireless push server 20. Server 20 splits the content received from content provider 12 into pieces which are compatible with the particular type of transport being used by wireless carrier 14. For instance, server 20 may split the data such that it conforms to maximum packet size constraints, character set requirements, etc. for the channel type or transport type being used. Prior to transmission, the data is preferably translated to a different form. Translation may include compression, encryption, encoding and then packaging.

Once the data has been split appropriately such that it conforms to the transport constraints, the data is then configured for transmission over the air through a wireless network (such as through a paging channel) to be received directly on mobile device 18. The transmitted data is received by a wireless receiver and driver component 22 on mobile device 18 where the data is prepared for use by mobile device 18.

Mobile device 18 can also includes a modem 24. Thus, rather than being transmitted through wireless carrier 14, the web content can be transmitted directly from web content provider 12 through a direct dial-up modem connection to mobile device 18.

Desktop computer 16 will also be described in greater detail later in the specification. Briefly, however, desktop computer 16 is preferably provided with a standard web browser, such as Internet Explorer 4.0 commercially available from the Microsoft Corporation of Redmond, Wash. That being the case, the users of desktop 16 can preferably subscribe to channels in a standard fashion which provide the user with certain channel content which can be browsed off-line or on-line. Desktop computer 16 is preferably provided with a loadable transport that accesses the script files and acts on the corresponding data file (in accordance with the script) to render the content where desktop computer 16 renders the data. Desktop computer 16, through the transport, can periodically retrieve or receive new and updated script, data and CDF files either for further transmission to mobile device 18 or simply for rendering the data. The script, data and CDF files can be transmitted either together or independently of one another. Since scripting files typically need updating much less frequently than the data files, this provides the user with the ability to view the web content on the desktop (off-line) while requiring only small amounts of bandwidth for incremental updating of the data files.

Desktop computer 16 also preferably includes synchronization component 26. Briefly, synchronization component 26 is configured to interact with a similar synchronization component 28 on mobile device 18 such that files which are the subject of synchronization can be synchronized from desktop computer 16 to mobile device 18, or vice versa. Once synchronized, both files (those on computer 16 and mobile device 18) contain up to date information.

More specifically, mobile device 18, in the preferred embodiment, can be synchronized with either desktop computer 16, or another mobile device 18, or both. In that instance, properties of objects stored in an object store on mobile device 18 are similar to properties of other instances of the same object stored in an object store on desktop computer 16 or another mobile device 18. Thus, for example, when a user changes one instance of an object stored in an object store on desktop computer 16, the second instance of that object in the object store of mobile device 18 is updated the next time mobile device 18 is connected to desktop computer 16 so that both instances of the same object contain up-to-date data. This is referred to as synchronization.

In order to accomplish synchronization, synchronization components 26 and 28 run on both mobile device 18 and desktop computer 16 (or another mobile device 18). The synchronization components communicate with one another through well defined interfaces to manage communication and synchronization.

Mobile device 18 is also preferably provided with a script interpreter which, in one preferred embodiment, is the same as or similar to the loadable transport on desktop computer 16. Such a transport may be, for example, a down-sized visual basic interpreter, which receives and interprets the formatting script. The script is associated with a certain data file (typically a text file) that holds the raw data for the web content. Thus, the script interpreter operates on the data associated with a given script to provide a rendering of the web content to the user of mobile device 18.

By separating the script from the data in the web content, web content can be transmitted to mobile device 18 over very low bit rate channels. The script will only typically need to be transmitted very infrequently. Also, since an individual file is typically much smaller than the script files, the data can be updated quite frequently, giving the user of mobile device 18 updated web content information, without transmitting new script. Thus, the separation of the script and data allows the transmission of web content information in a very efficient manner over low bit rate channels.

It is worth noting that, in the preferred embodiment, while mobile device 18 can be coupled to desktop computer 16, it can be also coupled to another mobile device 18. This connection can be made using any suitable, and commercially available, communication link and using a suitable communications protocol. For instance, in one preferred embodiment, mobile device 18 communicates with either desktop computer 16 or another mobile device 18 with a physical cable which communicates using a serial communications protocol. Other communication mechanisms are also contemplated by the present invention, such as infra-red (IR) communication or other suitable communication mechanisms.

Figure 2:
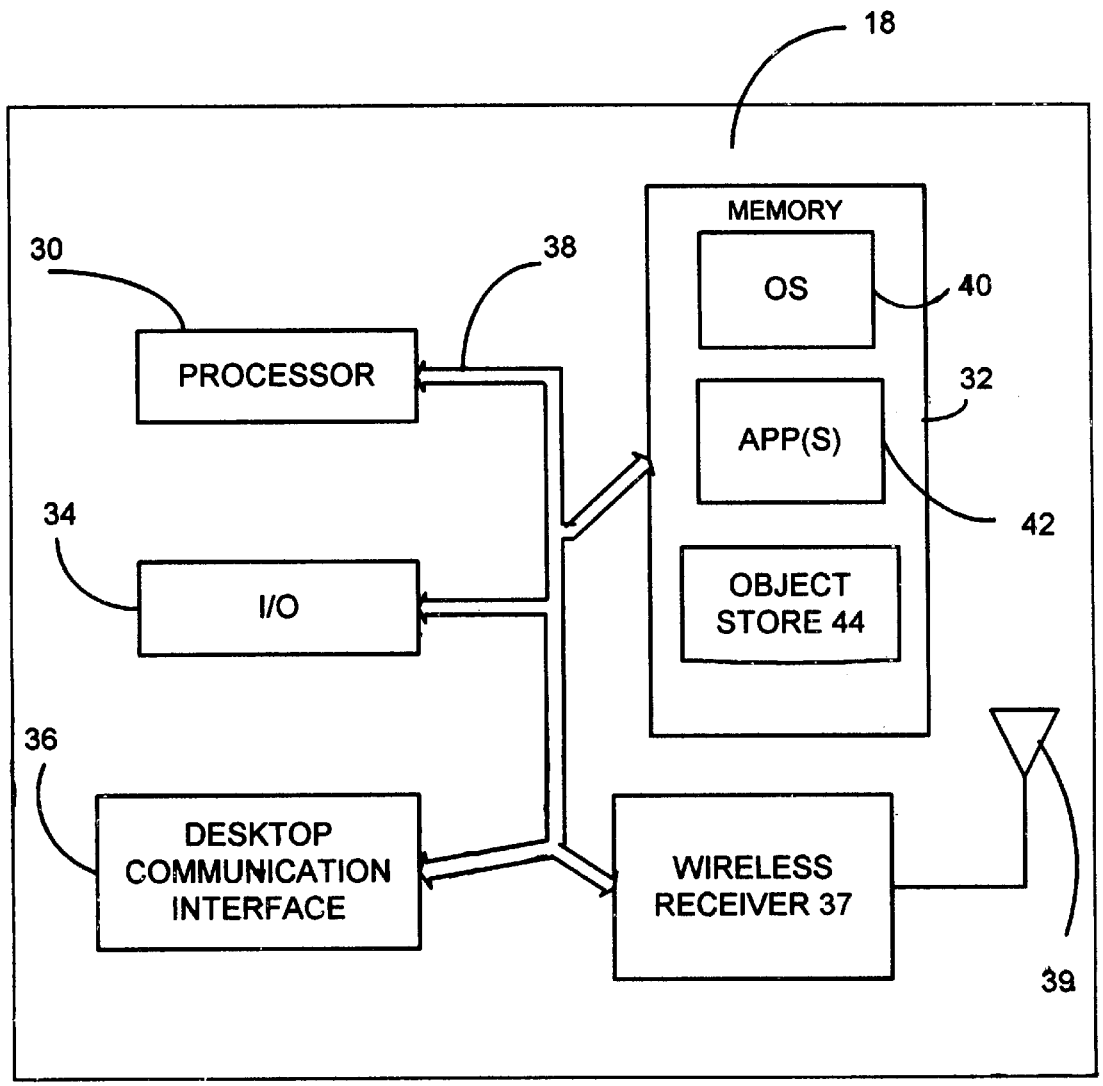
FIG. 2 is a more detailed block diagram of one embodiment of a mobile device shown in FIG. 1.

FIG. 2 is a more detailed block diagram of mobile device 18. Mobile device 18 preferably includes microprocessor 30, memory 32, input/output (I/O) components 34, desktop communication interface 36 wireless receiver 37 and antenna 39. In a preferred embodiment, these components of mobile device 10 are coupled for communication with one another over a suitable bus 38.

Memory 32 is preferably implemented as non-volatile electronic memory such as random access memory (RAM) with a battery back-up module (not shown) such that information stored in memory 32 is not lost when the general power to mobile device 18 is shut down. A portion of memory 32 is preferably allocated as addressable memory for program execution, while another portion of memory 32 is preferably used for storage, such as to simulate storage on a disc drive.

Memory 32 includes operating system 40, an application program 42 (such as a personal information manager or PIM) as well as an object store 44. During operation, operating system 40 is preferably executed by processor 30 from memory 32. Operating system 40, in one preferred embodiment, is a Windows CE brand operating system commercially available from Microsoft Corporation. The operating system 40 is preferably designed for mobile devices, and implements database features which can be utilized by PIM 42 through a set of exposed application programming interfaces and methods. The objects in object store 44 are preferably maintained by PIM 42 and operating system 40, at least partially in response to calls to the exposed application programming interfaces and methods.

I/O components 34, in one preferred embodiment, are provided to facilitate input and output operations from a user of mobile device 18. I/O components 34 are described in greater detail with respect to FIGS. 3 and 4.

Desktop communication interface 36 is optionally provided as any suitable communication interface. Interface 36 is preferably used to communicate with desktop computer 16, content provider 12, wireless carrier 14 and optionally another mobile device 18, as described with respect to FIG. 1. Thus, communication interface 36 preferably includes synchronization components 28 for communicating with desktop computer 16 and modem 24 for communicating with content provider 12. Wireless receiver and driver 22 are used for communicating with wireless carrier 14.

Figure 3:
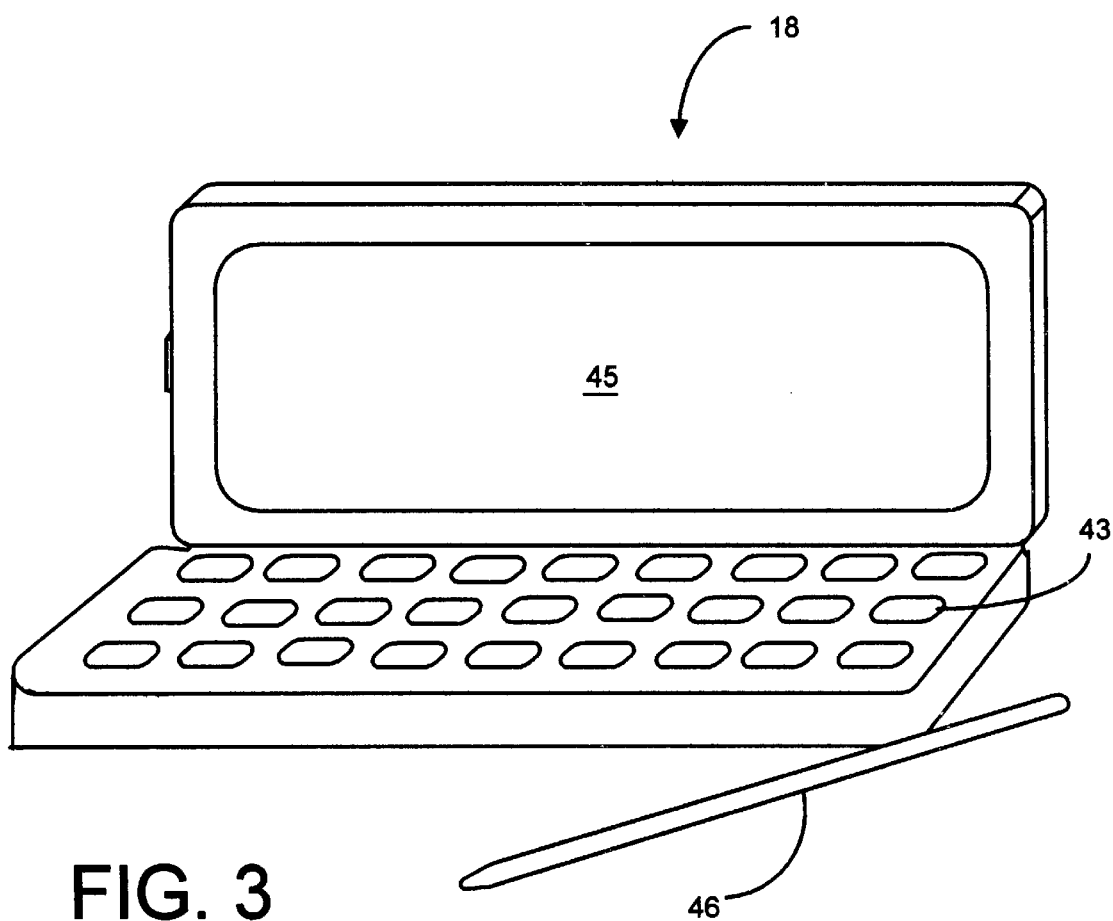
FIG. 3 is a simplified pictorial illustration of one embodiment of the mobile device shown in FIG. 2.

FIG. 3 is a simplified pictorial illustration of one preferred embodiment of a mobile device 10 which can be used in accordance with the present invention. Mobile device 10, as illustrated in FIG. 3, can be a desktop assistant sold under the designation H/PC having software provided by the Microsoft Corporation. In one preferred embodiment, mobile device 18 includes a miniaturized keyboard 43, display 45 and stylus 46. In the embodiment shown in FIG. 3, display 45 is a liquid crystal display (LCD) which uses a contact sensitive display screen in conjunction with stylus 46. Stylus 46 is used to press or contact the display 45 at designated coordinates to accomplish certain user input functions. Miniaturized keyboard 43 is preferably implemented as a miniaturized alpha-numeric keyboard, with any suitable and desired function keys which are also provided for accomplishing certain user input functions.

Figure 4:
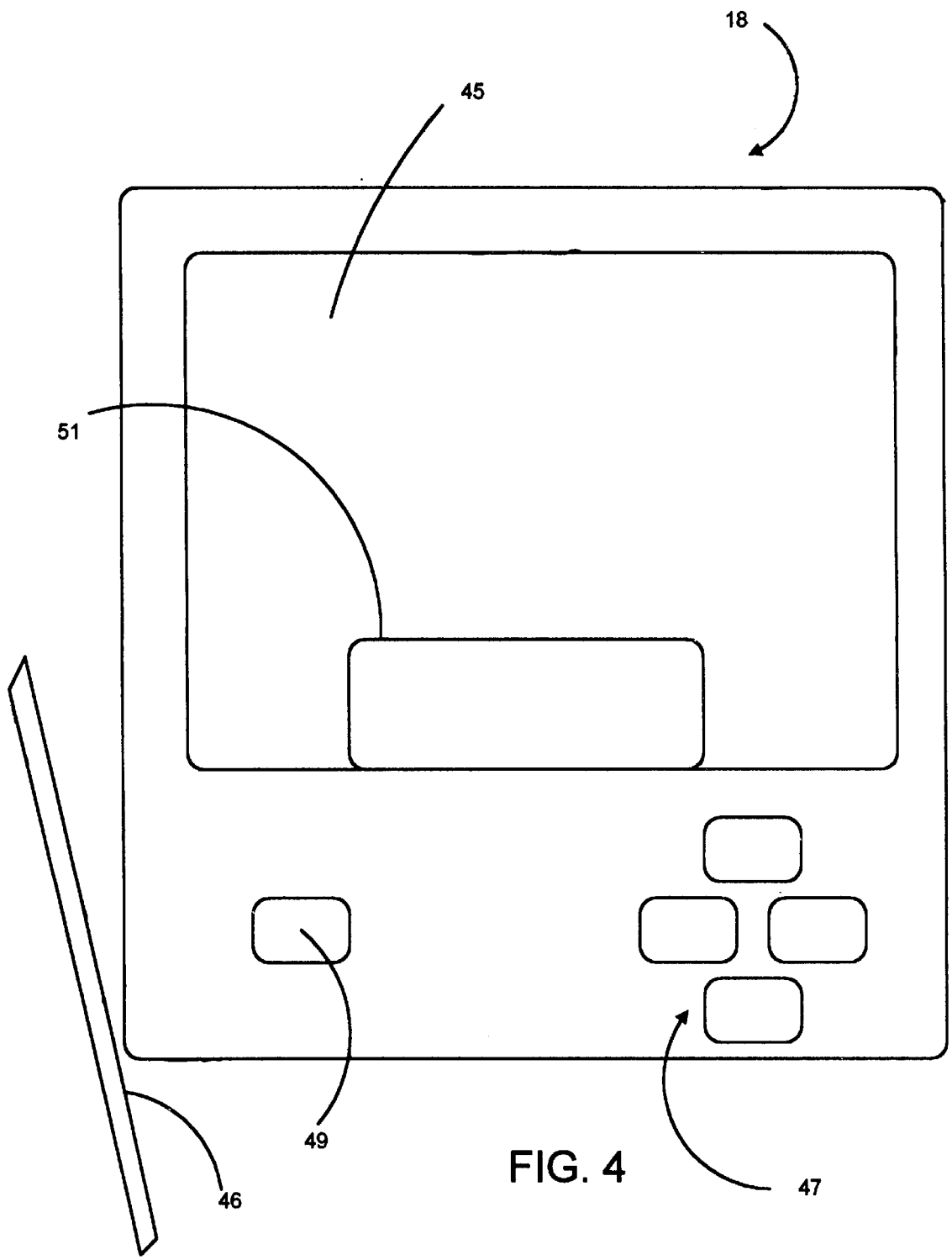
FIG. 4 is a simplified pictorial illustration of another embodiment of the mobile device shown in FIG. 2.

FIG. 4 is another simplified pictorial illustration of the mobile device 18 in accordance with another preferred embodiment of the present invention. Mobile device 18, as illustrated in FIG. 4, includes some items which are similar to those described with respect to FIG. 3, and are similarly numbered. For instance, mobile device 18, as shown in FIG. 4, also includes touch sensitive screen 45 which can be used, in conjunction with stylus 46, to accomplish certain user input functions. It should be noted that the display 45 for the mobile device as shown in FIGS. 3 and 4 can be the same size as one another, or different sizes from one another, but would typically be much smaller than a conventional display used with a desktop computer. For example, displays 45 shown in FIGS. 3 and 4 may be defined by a matrix of only 240×320 coordinates, or 160×160 coordinates, or any other suitable size.

The mobile device 18 shown in FIG. 4 also includes a number of user input keys or buttons (such as scroll buttons 47) which allow the user to scroll through menu options or other display options which are displayed on display 45, or which allow the user to change applications, without contacting display 45. In addition, the mobile device 18 also shown in FIG. 4 also preferably includes a power button 49 which can be used to turn on and off the general power to the mobile device 18.

It should also be noted that, in the embodiment illustrated in FIG. 4, mobile device 18 includes a hand writing area 51. Hand writing area 51 can be used in conjunction with stylus 46 such that the user can write messages which are stored in memory 42 for later use by the mobile device 18. In one illustrative embodiment, the hand written messages are simply stored in hand written form and can be recalled by the user and displayed on the display screen 45 such that the user can review the hand written messages entered into the mobile device 18. In another preferred embodiment, mobile device 18 is provided with a character recognition module such that the user can enter alpha-numeric information into mobile device 18 by writing that alpha-numeric information on area 51 with stylus 46. In that instance, character recognition module in the mobile device 18 recognizes the alpha-numeric characters and converts the characters into computer recognizable alpha-numeric characters which can be used by the application programs 42 in mobile device 18.

Figure 5:
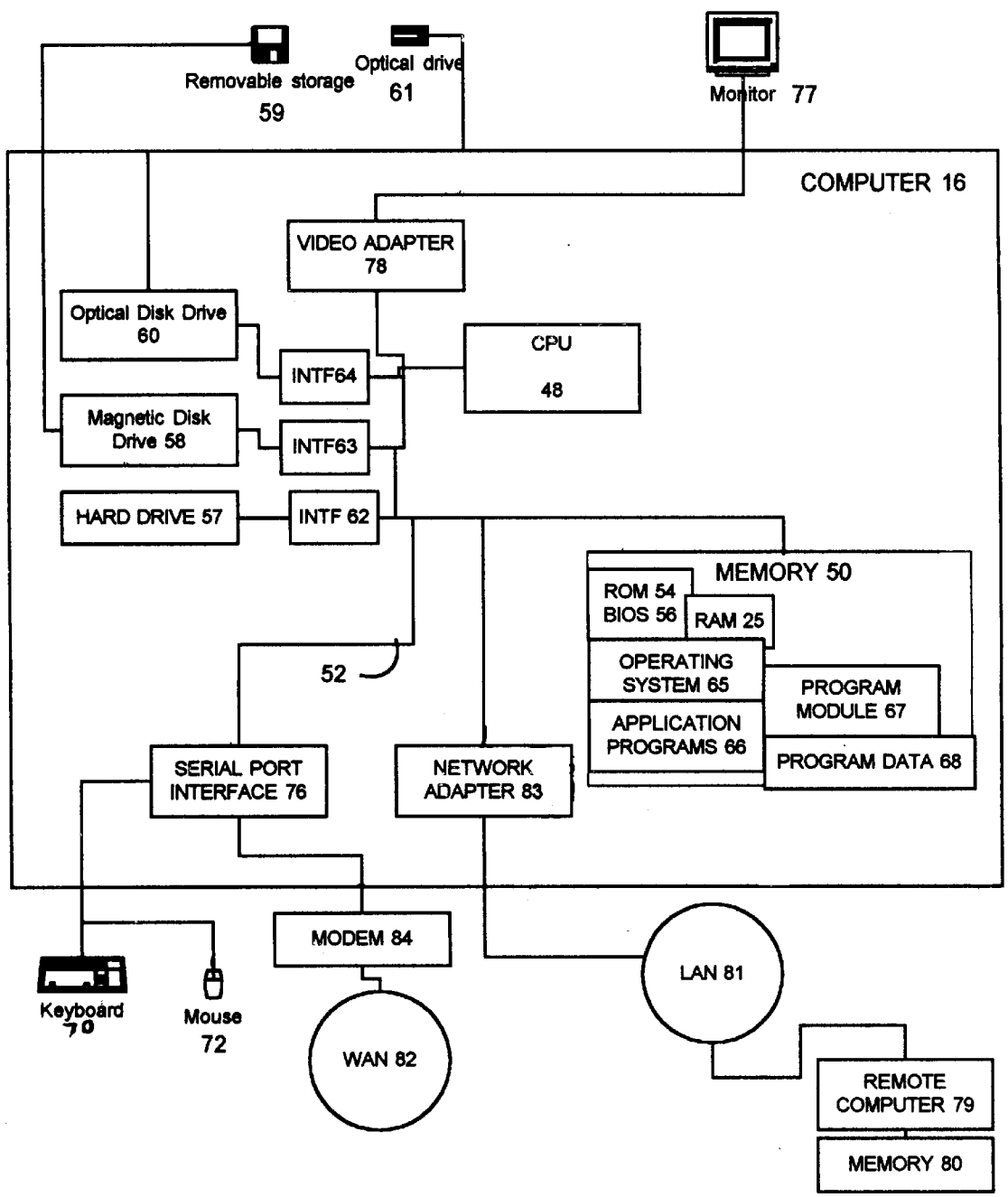
FIG. 5 is a block diagram of one embodiment of a desktop computer in accordance with one aspect of the present invention.

FIG. 5 and the related discussion are intended to provide a brief, general description of a suitable desktop computer 16 in which portions of the invention may be implemented. Although not required, the invention will be described, at least in part, in the general context of computer-executable instructions, such as program modules, being executed by a personal computer 16 or mobile device 18. Generally, program modules include routine programs, objects, components, data structures, etc. that perform particular tasks or implement particular abstract data types. Moreover, those skilled in the art will appreciate that desktop computer 16 may be implemented with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 5, an exemplary system for implementing desktop computer 16 includes a general purpose computing device in the form of a conventional personal computer 16, including processing unit 48, a system memory 50, and a system bus 52 that couples various system components including the system memory 50 to the processing unit 48. The system bus 52 may be any of several types of bus structures including a memory bus or memory controller, a peripheral bus, and a local bus using any of a variety of bus architectures. The system memory 50 includes read only memory (ROM) 54 a random access memory (RAM) 55. A basic input/output system (BIOS) 56, containing the basic routine that helps to transfer information between elements within the desktop computer 16, such as during start-up, is stored in ROM 54. The desktop computer 16 further includes a hard disk drive 57 for reading from and writing to a hard disk (not shown) a magnetic disk drive 58 for reading from or writing to removable magnetic disk 59, and an optical disk drive 60 for reading from or writing to a removable optical disk 61 such as a CD ROM or other optical media. The hard disk drive 57, magnetic disk drive 58, and optical disk drive 60 are connected to the system bus 52 by a hard disk drive interface 62, magnetic disk drive interface 63, and an optical drive interface 64, respectively. The drives and the associated computer-readable media provide nonvolatile storage of computer readable instructions, data structures, program modules and other data for the desktop computer 16.

Although the exemplary environment described herein employs a hard disk, a removable magnetic disk 59 and a removable optical disk 61, it should be appreciated by those skilled in the art that other types of computer readable media which can store data that is accessible by a computer, such as magnetic cassettes, flash memory cards, digital video disks (DVDs), Bernoulli cartridges, random access memories (RAMs), read only memory (ROM), and the like, may also be used in the exemplary operating environment.

A number of program modules may be stored on the hard disk, magnetic disk 59, optical disk 61, ROM 54 or RAM 55, including an operating system 65, one or more application programs 66 (which may include PIMs), other program modules 67 (which may include synchronization component 26), and program data 68. A user may enter commands and information into the desktop computer 16 through input devices such as a keyboard 70, pointing device 72 and microphone 74. Other input devices (not shown) may include a joystick, game pad, satellite dish, scanner, or the like. These and other input devices are often connected to the processing unit 48 through a serial port interface 76 that is coupled to the system bus 52, but may be connected by other interfaces, such as a sound card, a parallel port, game port or a universal serial bus (USB). A monitor 77 or other type of display device is also connected to the system bus 52 via an interface, such as a video adapter 78. In addition to the monitor 77, desktop computers may typically include other peripheral output devices such as speaker 75 and printers.

The desktop computer 16 may operate in a networked environment using logic connections to one or more remote computers (other than mobile device 18), such as a remote computer 79. The remote computer 79 may be another personal computer, a server, a router, a network PC, a peer device or other network node, and typically includes many or all of the elements described above relative to desktop computer 16, although only a memory storage device 80 has been illustrated in FIG. 4. The logic connections depicted in FIG. 4 include a local area network (LAN) 81 and a wide area network (WAN) 82. Such networking environments are commonplace in offices, enterprise-wide computer network intranets and the Internet.

When used in a LAN networking environment, the desktop computer 16 is connected to the local area network 81 through a network interface or adapter 83. When used in a WAN networking environment, the desktop computer 16 typically includes a modem 84 or other means for establishing communications over the wide area network 82, such as the Internet. The modem 84, which may be internal or external, is connected to the system bus 52 via the serial port interface 76. In a network environment, program modules depicted relative to desktop computer 16, or portions thereof, may be stored in the remote memory storage devices. It will be appreciated that the network connections shown are exemplary and other means of establishing a communications link between the computers may be used.

Desktop computer 16 runs operating system 65 that is typically stored in non-volatile memory 54 and executes on the processor 48. One suitable operating system is a Windows brand operating system sold by Microsoft Corporation, such as Windows 95 or Windows NT, operating systems, other derivative versions of Windows brand operating systems, or another suitable operating system. Other suitable operating systems include systems such as the Macintosh OS sold from Apple Corporation, and the OS/2 Presentation Manager sold by International Business Machines (IBM) of Armonk, N.Y. Application programs are preferably stored in program module 67, in volatile memory or non-volatile memory, or can be loaded into any of the components shown in FIG. 5 from a floppy diskette 59, CDROM drive 61, downloaded from a network via network adapter 83, or loaded using another suitable mechanism.

Figure 6:
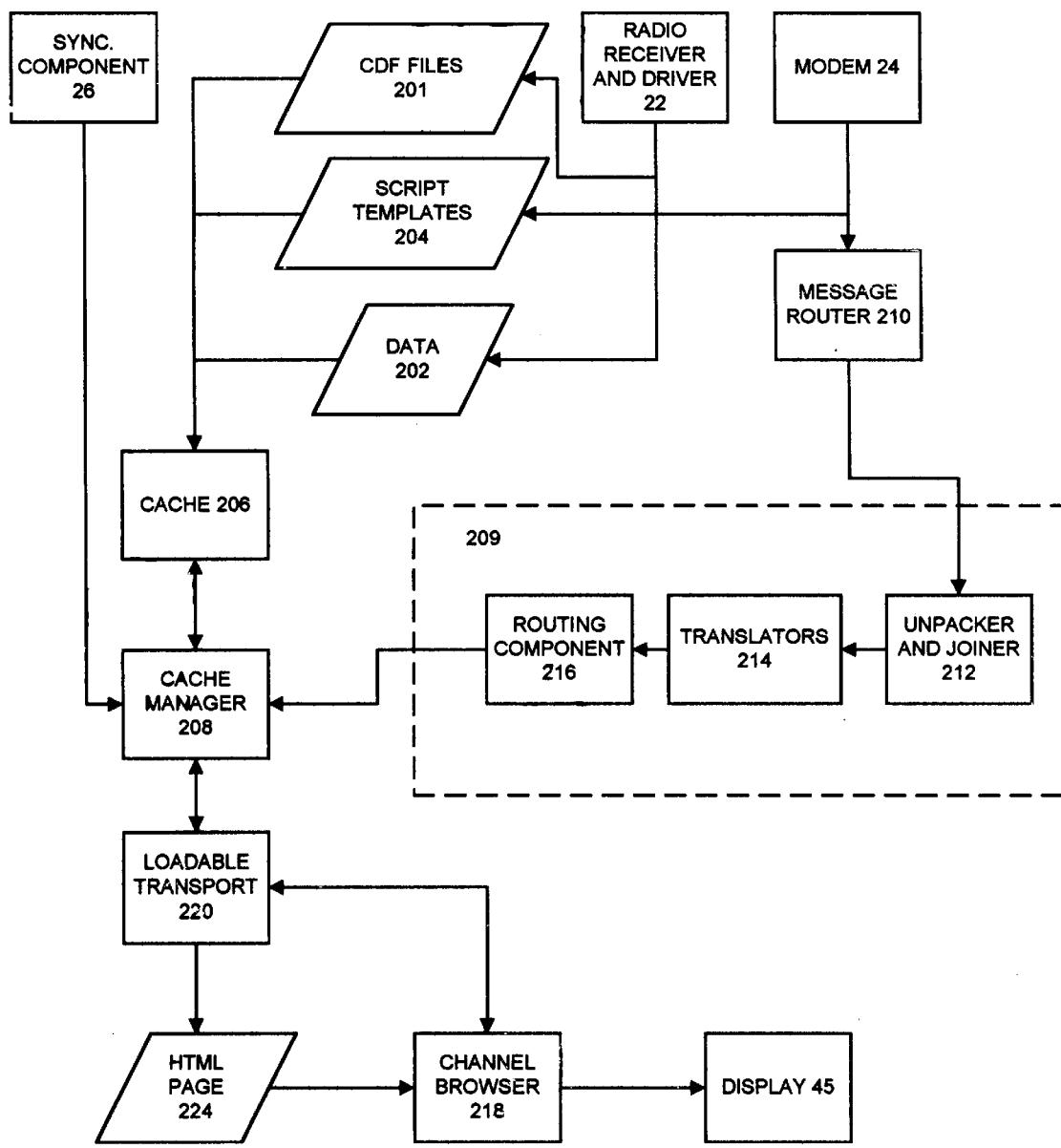
FIG. 6 is a flow diagram illustrating the operation of a mobile device in accordance with one aspect of the present invention.

FIG. 6 is a block diagram illustrating the functional architecture of mobile device 18. FIG. 6 shows similar items to those previously shown in the specification. Similar items are similarly numbered. FIG. 6 illustrates that mobile device 18 receives web content information either via synchronization component 26, wireless receiver (radio receiver and driver) 22 or modem 24. In any of those cases, CDF files 201 as well as script templates and data files, indicated by blocks 204 and 202, are eventually provided to cache memory 206. Where the web content information is received through synchronization component 26, the CDF files 201, script templates 204 and data files 202 may not be encrypted or encoded or otherwise formatted in the same fashion as they are for transmission over a wireless or modem channel. Therefore, the CDF files 201, script templates 204 and data files 202 are provided directly to cache manager 208. Cache manager 208 receives the CDF files 201, script templates 204 and data files 202, and provides them to cache memory 206. Cache manager 208 includes memory manipulation and timing components as well as data transfer components, which are suitable for transferring the CDF files 201, script templates 204 and data files 202 to a particular location in cache memory 206, and to track that location.

If, on the other hand, the web content is received over wireless receiver and driver 22 or modem 24, additional processing steps must be undertaken prior to caching the data. Wireless receiver and driver 22 is a physical layer that receives and filters messages and generates wake-up events to mobile device 18. In one preferred embodiment, the information transmitted is first translated (such as compressed, encrypted, encoded and packaged) before transmission. Thus, the data must be translated back to its original form prior to further use by mobile device 18. Therefore, the data is first provided to message router 210. Message router 210 acts to record the message and route the received message to a translation layer 209. In FIG. 6, translation layer 209 includes unpackager and joiner component 212, a group of additional translators collectively labeled 214 and a further routing component 216.

Unpackager and joiner block 212 acts to receive, unpack and order a group of packets being transmitted. The unpackager rejoins packets of any long messages which were split up by wireless carrier 14. The ordered data is provided to translation components 214.

Translation components 214 act to reformat or translate the data into appropriate form to be handled by content handler 216. For example, once the packets which comprise a message have been unpacked and rejoined by unpacker and joiner 212, translation components 214 may typically decompress, decrypt and decode those packets.

Content handler 216 delivers the unpacked, joined and translated message to the appropriate registered destination (i.e., to the appropriate application or other functional block) on mobile device 18. In the embodiment illustrated in FIG. 5, content handler 216 provides the information to cache manager 208 which stores it in cache 206.

When the user wishes to off-line browse the web content stored in cache 206, the user launches an appropriate application program indicated by channel browser block 218 in FIG. 5. Channel browser 218 preferably generates suitable user interfaces on display 45 which provide the user with the ability to choose a certain channel to be viewed.

Channel browser 218 is configured to interact with a loadable transport 220 which is, in turn, coupled to cache manager 208. In response to the user requesting to view information provided via the chosen channel, loadable transport 220 requests cache manager 208 to retrieve the corresponding web content information (in the form of script templates and data files) from cache 206. The desired script templates 204 and data files 202 are provided from cache manager 208 to loadable transport 220.

The script interpreter in transport 220 is preferably a visual basic script interpreter which interprets script templates 204 and acts on data files 202 as a function also of the CDF file 201 to provide a desired rendering of the web content. In the embodiment illustrated in FIG. 5, the web content is rendered as a conventional hypertext mark-up language (HTML) page 224. Loadable transport 220 then provides the HTML page 224 rendering to channel browser 218 for viewing by the user of mobile device 18 on display 45.

The system 10 allows logging of desired information for use by content provider 12. In other words, by providing an entry in the CDF file 201, the content providers can tag certain items which they want to track (i.e., they can tag certain items for which they would like to know when, and for how long, those items were viewed by any given user).

For example, when the user launches channel browser 218, and requests information from loadable transport 220, loadable transport 220 determines whether the requested information includes the appropriate CDF tag indicating that the content provider wishes to log information regarding the time and duration which the information was viewed. If so, loadable transport 220 logs information which is representative of the time and duration that the information was viewed by the user. This information is stored in cache 206 in a location which corresponds to that particular web content information.

The next time mobile device 18 is synchronized with desktop computer 16, not only is mobile device 18 updated with the current web content received by desktop computer 16, but desktop computer 16 is updated with the current logging information maintained by mobile device 18. Similarly, the next time the browser on desktop computer 16 accesses the appropriate web content from content provider 12, the logging information is transmitted from desktop computer 16 to content provider 12. In one preferred embodiment, since the browser on desktop computer 16 is Internet Explorer 4.0, logging information which has been synchronized to desktop computer 16 is transmitted to content provider 12 when the scheduler of Internet Explorer 4.0 is next invoked on desktop computer 16.

Figure 7:
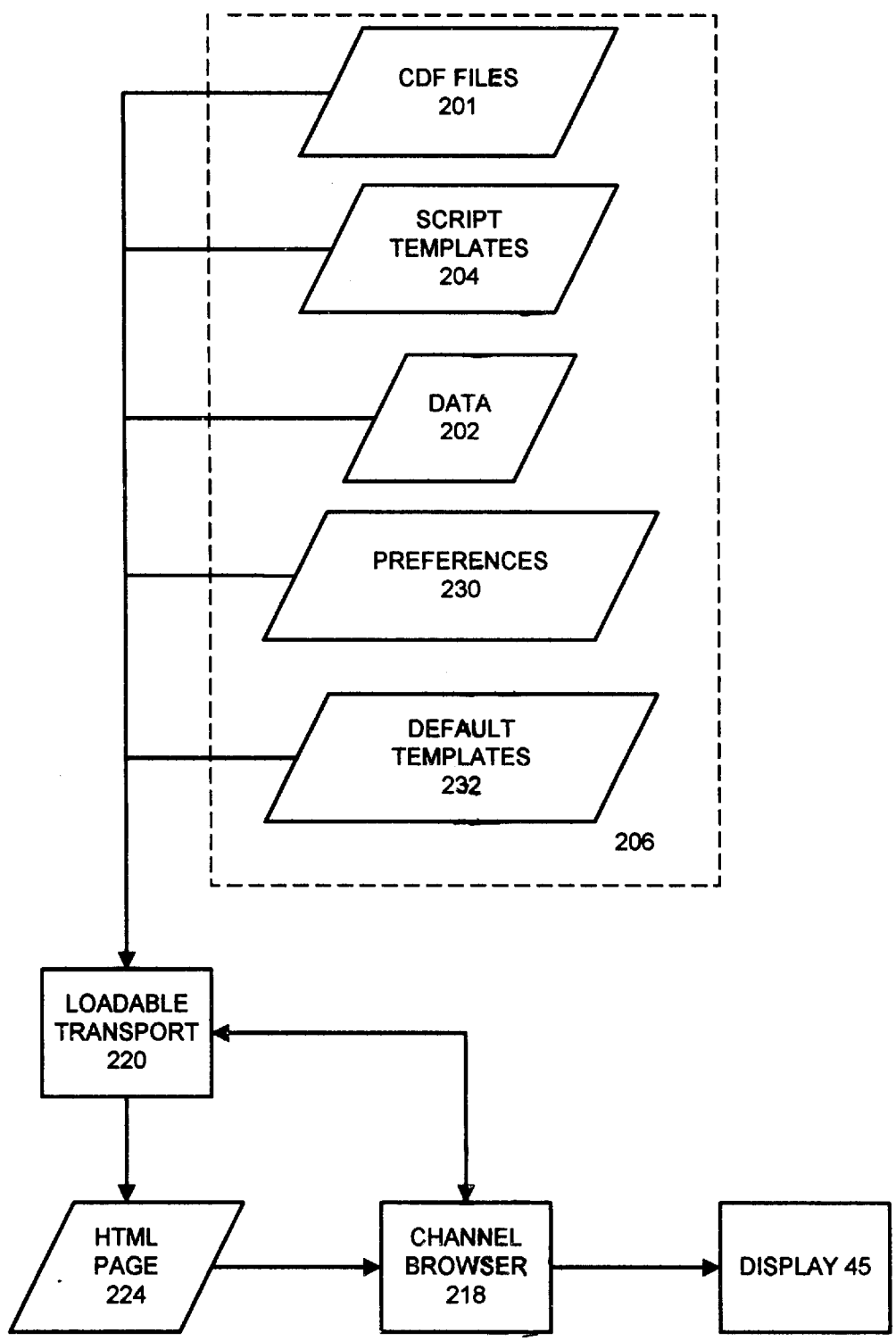
FIG. 7 is a simplified block diagram of FIG. 6.

FIG. 7 is a simplified block diagram of a portion of FIG. 6 focusing on those components used to access data stored on the mobile device 18 for display to the user through the display 45. In FIG. 7, the CDF files 201, data 202, script templates 204 and preferences 230, discussed below, are shown as part of cache 206.

One aspect of the present invention includes use of the CDF files 201 for construction of HTML pages 224. In particular, HTML pages 224 combine the script templates 204 and data 202 using structural information contained in the CDF files 201. For example, a particular script template 204 determines what subchannel of a CDF file 201 is being displayed and obtains the title and logo for that subchannel from the CDF file 201, incorporating them into the HTML page 224. In addition, particular data items such as an article or picture and/or additional subchannels within the subchannel can be obtained from the CDF file 201 to present an index to the subchannel being displayed. Typically, since items will change frequently as new data is obtained, item titles for the HTML page 224 can be obtained directly from the data stored in the data 202. Although this method of blending script templates 204, data 202 and CDF files 201 is more complex than conventional systems and methods where full HTML pages are transferred from a server to a client, this method is beneficial. In particular, the present system and method is able to deliver content in small segments of data instead of full HTML pages. This incremental approach makes it efficient and economical to update time-critical information, such as stock market values during peak network hours. The system and method also allows the use of default script templates 232 stored in the cache 206. The default script templates 232 can be used to render channel content (i.e. subchannels and data) if a particular script template is missing.

CDF is a standard for creating "channels" for use with browsers such as Internet Explorer 4.0. The CDF standard is based on the Extensible Markup Language (XML). One aspect of the present invention includes additional tags to extend CDF for improved use on mobile devices. Specifically, the additional tags are used to navigate through the CDF files 201 when content is to be displayed on the display 45 in order to reduce the necessary storage space on the mobile device 18. Table 1 below is an example of a CDF file in accordance with the present invention.

TABLE 1

```
—       <!-Declare item scripts -->
        <ITEM HREF="Http://www.microsoft.com/test/script1.mcs", ID="IS1">
            <USAGE VALUE="None"/>
K       </ITEM>
        <ITEM HREF="Http://www.microsoft.com/test/script2.mcs", ID="IS2">
            <USAGE VALUE="None"/>
        </ITEM>
—       < -- Declare channel scripts -->
        <ITEM HREF="Http://www.microsoft.com/test/script3.mcs" ID="CS1">
            <USAGE VALUE="None"/>
J       </ITEM>
        <ITEM HREF="Http://www.microsoft.com/test/script4.mcs" ID="CS2">
            <USAGE VALUE="None"/>
—       </ITEM>
    A   <CHANNEL HREF = "mctp://www.microsoft.com/test/test.cdf", ID="test"
    C   BASE = "http://www.microsoft.com/test/
    B   SELF = "http://www.microsoft.com/test.cdf/>
            <TITLE VALUE = "Test Channel" />
            <!-IS1 is the general item script to use within the channel -->
            <ITEMSCRIPT VALUE-"IS1"/>
            <!-CS1 is the general channel script to use within the channel -->
            <CHANSCRIPT VALUE = "CS1"/>
    E       <ITEM HREF = "Http://www.microsoft.com/test/AD1.mad" ID="AD1">
                <USAGE VALUE = "MobileAd"/>
            <ITEM>
            <ITEM HREF = "Http://www.microsoft.com/test/AD2.mad" ID-"AD2">
                <USAGE VALUE = "MobileAd"/>
            <ITEM>
    G       <CHANNEL ID = "C1" DEFAULTPREF = "ON">
                <TITLE VALUE = "Test Subchannel 1" />
                -This subchannel is also rendered by the general channel script
                CS1 -->
                <ITEM HREF="http://www.microsoft.com/test/item-a.mcd" ID="ITA">
                <!This item is rendered by the item-specific IS2 script -->
                    <ITEMSCRIPT VALUE="IS2"/>
                    <USAGE VALUE="MOBILECHANNEL"/>
                </ITEM>
                ......
            </CHANNEL>
    H       <CHANNEL ID = "C2" DEFAULTPREF = "OFF">
                <TITLE VALUE = "Test Subchannel 2" />
                -This subchannel is rendered by the channel-specific script CS2
        -->
                <CHANSCRIPT VALUE = "CS2" />
                <ITEM HREF="http://www.microsoft.com/test/item-b.mcd"
                ID="ITB">
                <!-This item is also rendered by the general IS1 item
                script -->
                    <USAGE VALUE="MOBILECHANNEL"/>
            </ITEM>
        </CHANNEL>
    </CHANNEL>
```

Referring to Table 1, the path of the CDF is present in two attributes of the top-level "CHANNEL" tag that is standard in CDF files. In particular, the "HREF" attribute, indicated at "A" references the CDF path using the transport protocol of the loadable transport 220 (FIG. 6), for example, a Mobile Channels Transport Protocol (MCTP) can be used. The HREF attribute uses the MCTP prefix to indicate the CDF file is for a mobile device 18. If the CDF file is present on the desktop computer 16 (FIG. 1) rather than on the mobile device 18, the MCTP prefix can invoke special processing when referenced by the browser used on the desktop computer 16. Unlike the HREF attribute as used by browsers such as Internet Explorer 4.0 on the desktop computer 16, the URL does not directly indicate the page to render. Rather, the attribute references the top-level channel as specified by the CDF file.

The "SELF" attribute "B" references the CDF path using the standard HTTP prefix. Unlike standard implementation of the CDF on the desktop computer 16, the SELF attribute is preferably used with the top-level CHANNEL tag.

The "BASE" attribute "C" has the same functionality in the CDF file of the present invention as it does for use in a browser on the desktop computer 16. Its URL is an HTTP URL. In the example illustrated, the HREF attribute "A" for the top-level CHANNEL tag is the only one that has a transport protocol-style URL. All other HREF attribute values are of the HTTP-style Several attributes and attribute values that may appear in the CDF files 201 according to the present invention appear in standard CDF tags. The tags are described in the following table.

TABLE 2

| | |
|---|---|
| ID | A short string identifier for the CHANNEL, ITEM, and LOGO elements. |
| DEFAULTPREF | A Boolean operator indicating the suggested preference setting for a CHANNEL element. Values include "On" or "Off". |
| USAGE | New usage values "MobileChannel", "MobileDesktopComputer" and "MobileAD". |

TABLE 2-continued

| | |
|---|---|
| CHANNEL | CHANNEL element may take a USAGE tag specifying either the "MobileChannel or "MobileDesktop Computer" USAGE values defined above. It is required for the top-level CHANNEL element of a Mobile Desktop Component. |

Each tag or attribute is discussed in detail below:
"ID"

An ID tag is a text string used as an attribute to identify the specified element. An ID tag must be provided for all CHANNEL, ITEM, and LOGO elements in a mobile channel.
ID = "ChanId"
ID = "ItemId"
I D= "LogoId"

An ID tag is used for short and quick references both within the CDF file 201 and within the script templates 204. Within the CDF file 201, the ID tag is used as a value for both CHANSCRIPT and ITEMSCRIPT, discussed below, tags to refer to the associated ITEM tag that represents the script template 204.

Within the script template 204, the ID tag is used, along with the MCTP discussed below, to form unique URLs. The ID tag is used by the loadable transport 220 to uniquely reference a channel or item. MCTP references are of the form
" mctp://Cdfid/ChanID" for a channel or
" mctp://CDFid/ItemID" for an item.

In one embodiment, the string length of an ID tag is kept to the minimum necessary to uniquely define it within the CDF over time. Keeping the ID string length short is important in order to conserve network bandwidth and storage space.

In the CDF file 201, the ID tag of the top-level channel is used as a handle to the channel. In one embodiment, the maximum length of the ID string is 64 characters, but a handle of between 6 and 10 characters is recommended for the top-level ID to be unique. The following are three code examples.

| | |
|---|---|
| <CHANNEL ID | = " Sports" > |
| <ITEM HREF | = " www.microsoft.com/test/sports/article001.mcd" |
| ID | = " Art1" > |
| <LOGO HREF | = " www.microsoft.com/test/sports/sportslogo.gif" |
| STYLE | = " IMAGE" |
| ID | = " L_Sports" |

The ID tag is preferred for each parent element and can be of a single occurrence.
"USAGE"

For the USAGE tag, three new values are provided:
(1) MobileChannel
The statement,
<USAGE Value = "MobileChannel" /> specifies the channel as a channel or a data item as for use with the mobile device 18. The top-level channel should be given a USAGE value of "MobileChannel". When the USAGE value is set to "MobileChannel", items will be recognized by the channel browser 218 and displayed on the display 45 of the mobile device 18 but not recognized by a channel browser on the desktop computer 16. This feature makes it possible to properly display special data items (having the file extension ".mcd") on the mobile device 18 and to ignore them when the CDF 201 is used with the desktop computer 16. For example,
<ITEM HREF=" http//www.microsoft.com/test1.mcd" ID=" T1"
  <USAGE VALUE ="MobileChannel/>
</ITEM>
<ITEM HREF=" http//www.microsoft.com/test2. mcd" ID=" T2"
  <USAGE VALUE ="None/>
</ITEM>

Item T1 above is a data item for the mobile device 18 and will be recognized by the channel browser 218, but not by the channel browser on the desktop computer 16. Item T2 is a script and will not be recognized by the channel browsers for the mobile device 18 or the desktop computer 16 since the value equals "None"

(2) MobileDesktopComponent
The statement
<USAGE VALUE ="MobileDesktopComponent"/>
specifies the channel as a component viewable on the display 45 in conjunction with other applications such as personal information managers, for example, schedulers and electronic mail applications.

(3) MobileAd
The statement
<Usage value = "MobileAd"/>
  specifies an item as an advertisement viewable on the display 45. For the following example:
<ITEM HREF = http://www.microsoft.com/AD1.mad" >
  <USAGE VALUE = "MobileAd">
</ITEM>

"AD1.mad" specifies the advertising to be displayed according to the script templates 204, discussed below. In the example of Table 1, two advertisements are defined in the top-level channel at "E". When the top-level channel is displayed on the display 45 according to the script template 204, one or both of the advertisements can also be displayed. In an alternative embodiment, the script template 204 can alternate display of the advertisements if more than one is present. In the example of Table 1, the advertisements are defined with respect to the top-level channel; however, a feature of the present invention allows the advertisements also to be displayed when the subchannels "C1" or "C2" are also displayed without having to repeat the syntax for the advertisements in the subchannel definition. As used herein, this feature is called "inheritance". If desired, new advertisements can be defined in the subchannels.
DEFAULTPREF
The DEFAULTPREF tag can be used as follows:
<CHANNEL
ID = "ChanId"
DEFAULTPREF = "ON" | " OFF"

In the example of Table 1, the DEFAULTPREF tags are used at "G" and "H".

The DEFAULTPREF tag marks a subchannel with specific default preferences. In other words, the DEFAULT-PREF tag controls which subchannels a user will receive content for by default. By default, when content for a new channel is provided to the mobile device 18 items within subchannels that are marked with the attribute DEFAULT-PREF = "OFF" are not transferred.

The feature allows the content provider 12 to create a channel that offers more content than can reasonably be accommodated by the limited storage resources available on the mobile device 18, and yet does not, by default, overwhelm the mobile device 18 with all of the channel's content. In one embodiment, the DEFAULTPREF tags are examined are stored at 230 when the channel is first provided to the mobile device 18. The user can change and store his or her preferences 230, as desired, to include more or less content than the DEFAULTPREF settings allow.

The DEFAULTPREF tag can have values of either "ON" or "OFF". If DEFAULTPREF attribute is not specified, the mobile device 18 treats the subchannel as if it were marked with DEFAULTPREF="ON". The DEFAULTPREF tag can appear only once in a CHANNEL element.

In addition to the tags described above, which are present in CDF files of prior art, but now include new attributes, the CDF files 201 also include new tags for use with the script templates 204 and data 202. The new tags are described in the following table.

TABLE 3

| Tag | Description |
| --- | --- |
| CHANSCRIPT | Identifies the ID of the script file to render the channel and subchannels. |
| ITEMSCRIPT | Identifies the ID of the script file to render the item data file. |
| ITEMFORMAT | Defines the file structure for data files. |

Each tag is discussed in detail below:

CHANSCRIPT

The CHANSCRIPT tag is generally of the form:
<CHANSRIPT VALUE = "ChannelID"/>
where "ChannelID" specifies the URL. In the example of Table 1, the script for display of a channel or a subchannel is denoted with a ".mcs" extension as indicated at "J". In one embodiment, "tag inheritance" is provided where the CHANSCRIPT tag value will apply to all channels or "child" channels of the current channel or subchannel. The subchannel CHANSCRIPT tag will supersede any CHANSCRIPT value previously defined by a higher or "parent" CHANNEL element. The VALUE attribute specifies the ID of the ITEM element corresponding to the script to be run to render this level of the channel. For example, in Table 1,
    <CHANSCRIPT VALUE=CS1"/>
specifies use of a particular script template where the channel script identified by "CS1" has been defined in the beginning portion of the CDF file.

The top-level CHANNEL element can have at least one CHANSCRIPT tag as the child element. Each subchannel can have at most one such tag.

ITEMSCRIPT

The ITEMSCRIPT tag is generally of the form:
<ITEMSCRIPT VALUE = "ItemID"/>
where "ItemID" specifies the URL. In the example of Table 1, the script for display of an item is denoted with a ".mcs" extension as indicated at "K". In one embodiment, "tag inheritance" is provided where the ITEMSCRIPT tag value applies to all child items of the current channel or subchannel. Subchannel ITEMSCRIPT tag supersedes any ITEMSCRIPT value previously defined by a parent CHANNEL element. The VALUE attribute specifies the ID of the ITEM element corresponding to the script to run to render this level of the channel. For example, in Table 1,
<ITEMSCRIPT VALUE = "IS1" />
specifies a particular script template where the script identified by "IS1" was previously defined in the CDF. It should be noted that when the following statement:
    <USAGE VALUE="NONE" />
appears in conjunction with a script file, the VALUE attribute of "None" for the USAGE tag prevents the script file from being displayed by the channel browser 218.

The top-most CHANNEL element can have at least one ITEMSCRIPT tag. At all other channel levels there can be at most one such tag.

ITEMFORMAT

The ITEMFORMAT tag is generally the form:
<ITEMFORMAT VALUE="header_block; repeat_block"/>

The tag specifies the format of a class of data items by identifying the associated file structure. The data items are simple text files that can have a unique header and a repeating block structure for record-oriented data. Helper functions are provided in the scripting environment to access the data content using information contained in the ITEMFORMAT tag. Both header_block and repeat_block are optional. But at least one or the other of the header_block or the repeat_block must exist. If repeat_block exists, it should be preceded by a delimiter such as a semi-colon (;) as indicated above. The header block typically contains the description about the data items. And the repeatable data block contains description about particular data items therein. The header_block and repeat block are of the form: Vi [=Ti], for i=1 to n
Here "Vi" is the field name of the block value and "Ti" is the optional type of the block value. If "Ti"is omitted, a default value "HTML" is assumed. Valid types are listed in the following table:

TABLE 4

| Type | Description |
| --- | --- |
| HTML | HTML text including markup. |
| TEXT | Same as HTML. |
| IMG | ID of image item in CDF files. |
| HREF | URL to a page, for example, data file and channel script. |

A data block is merely a group of values. There is one value per line. Any meaningful data file should have at least one data block. For example, three data blocks might be used to show a portfolio of three stocks. In the following example, a "Market" channel displays stock values listed in the "Stocks.mcd" file. The header gives the title and displays the data of the shown stocks. The data to be listed includes the name, the low price, high price, and closing prices of each stock.

<ITEM HREF="http://www.market.com/Stocks.mcs"
        ID="Stock_S"
        <USAGE VALUE="None"
    </ITEM>
    . . .
    <CHANNEL ID = "Stock_C" >
        <TITLE VALUE="Market"/>
        <ITEM HREF="http://www.market.com/stocks.mcd"
        ID="Stock_D">
            <USAGE VALTE="MobileChannel"/>
            <ITEMSCRIPT VALUE="Stock_S"/>
            <ITEMFORMAT VALUE="Title,Date, Picture=
            IMG;
                Name, Low, High, Close"/>
        </ITEM>
    </CHANNEL>

Here the header block has three values, "Title", "Date" and "Picture", and the data block has four: "Name", "Low", "High" and "Close".

IMG indicates the field that represents an image, such as JPG or GIF. The field value is the identifier of the item defining the URL of the image. The built-in item script creates an IMG value to display this item.

The data block may be repeated to build a table of stock prices. If the Stocks.mcd file contains a single data block, the script displays a single stock per page. If it has multiple data blocks, the script could display a table of stocks.

The repeat block can be omitted, as shown in the following example, which is represents a news article with a title, an image, and the body of text:

<ITEMFORMAT VALUE="TITLE, PICTURE=IMG, BODY"/>

The header block can also be omitted, as shown in the following example that represents a stock page with a listing of stocks. Note the presence of the semi-colon (;) to indicate the value list. It is, therefore, a repeat block and not a header block.

<ITEMFORMAT VALUE="; Name, Low, High, Close"/>

It should be noted that not all the standard tags are supported and used on the mobile devices 18. In particular, the CDF files 201 need not support any software update channel tags (EARLIESTTIME, INTERVALTIME, and LASTTIME tags) if the channel browser 218 is operated only in an "offline" mode. In addition, the LOGIN tag can be ignored. However, while the EARLIESTTIME, INTERVALTIME, and LASTTIME tags are ignored on the mobile device 18 when operated offline, they are supported if the mobile device 18 can be operated in an "on-line" mode. In addition, if the CDF file 201, script template files 204 and data file 202 structures is used on the desktop computer 16 or other similar device, the software update tags will be recognized and used to download the channel from the content provider 12.

Mobile Channels Data Files

The data files 202 are used to deliver incremental data for a channel. These are simple text files that contain data with one data item per line in the file. Within the CDF file 201, a structure for the data file may be declared using an ITEMFORMAT tag as discussed earlier.

In the example, each data file has a ".mcd"extension. The CDF file 201 includes an ITEM tag to define the "mcd" file. Within the ITEM tag, the ID attribute is used as a short-hand way to reference the "mcd" file from within the script without having to reference its complete URL.

Unlike the conventional script-drives approach, where script files are run and call for data to display, in the present system the opposite is performed for displaying incremental data. Because new information can come in at any time within a new "mcd" file, it is more efficient to activate the script template 204 to display data 202 when it arrives. This data-triggers-script approach has an added benefit in that it permits the inheritance of script templates.

The file format for data files 202 is flexible. It is simply a text file that contains the data, such as references to images with each item on a separate line. The present system exposes methods within the scripting environment for reading this content from the data file 202.

The ITEMFORMAT tag is used to specify the kind of data present in the file. Generally, files have the following format:
[Head Block]
[Data Block 1]
[Data Block 2]
. . .
[Data Block n]

As discussed above, the use of particular script templates 204 in the CDF files 201 are identified with the CHANNELSCRIPT and ITEMSCRIPT tags. The script templates 204 are invoked in a data-driven manner. When it is time to display a particular data file 202, the reference is made to the data file 202 and the appropriate item script template is located to display it. Likewise, when it is time to show channel content, such as a listing a subchannels or data items, the reference to the channel is made and the appropriate channel script template is located to display it.

ITEMSCRIPT Selection

When it is necessary to render a particular data file 202 through the channel browser 218, the appropriate script template 204 must be selected. Item script templates are responsible for rendering data files and are invoked as a result of referencing the URL of the data file 202. The appropriate script template 204 is selected based upon the proximity of an ITEMSCRIPT tag to the particular data file 202 to be rendered.

In the embodiment illustrated, an item URL, as it appears in scripts, is in the following form:
Mctp://CDFid/ItemID Here mctp specifies the use of Mobile Channels Transport Protocol to resolve the URL and to invoke the scripting engine. CDFid is the ID tag of the top-level CHANNEL element and is used to select the correct CDF file in the CDF files 201. ItemId is the ID tag of the ITEM element for the data file 202 to be rendered.

The data file appears in an ITEM element within the channel hierarchy. The location of the ITEM element relative to an ITEMSCRIPT tag determines which script template 204 will be used to render the data. The script template 204 is identified by matching the ID value in the ITEMSCRIPT tag with the ID value of an ITEM element, which is the item for the script template 204, within the CDF file 201.

ITEMSCRIPT tags can be children of either CHANNEL elements or ITEM elements. An ITEMSCRIPT tag determines the script template 204 to be used for all items of the current channel and its subchannels, if no further ITEMSCRIPT tags are associated with the subchannels. An item script template 204, as identified by ITEMSCRIPT, for a CHANNEL or ITEM element supercedes any previously defined ITEMSCRIPT value.

Thus, an inheritance model is used. When it is necessary to render a particular data item, the nearest ITEMSCRIPT element in the hierarchy is used to determine what script template 204 should render the data. In the event that the appropriate script template 204 is not available on the mobile device 18, a built-in script template is used to render the data. The default item script template is stored at 232 and simply enumerates through all the fields specified in the ITEMFORMAT tag and for each one displays the appropriate data from the specified data file. If the data file contains a repeating block, all the block values are enumerated on the page in a list until the end of the data file is reached.

By convention, item script templates are specified at the top-level of a channel, usually at the top of the file as shown in Table 1. Each item script template is assigned a unique ID. The script can then be referenced using an ITEMSCRIPT element from any location in the CDF loadable transport 220, rather than the usual HTTP protocol.

It should be noted that due to a limitation in the way standard channel browsers for the desktop computer 16 handles URLs for images, in order for an image to be rendered on the desktop computer 16 images should be referenced using standard HTTP references, rather than the loadable transport. If allowing the channel to be viewed, the desktop computer 16 is not important, then the loadable transport type URLs may be used.

CHANNEL SCRIPT Selection

In addition to rendering data from data files, such as a news article, it is usually necessary to render the current location within the CDF so that the user can navigate to the desired data. When it is necessary to render a CDF navigation page (i.e. the channel and/or subchannels) on the display 45, the appropriate script template must be selected. Channel script templates are responsible for rendering the CDF navigation pages supplied by the content provider 12. As with an item script template, referencing the URL of the subchannel results in the invocation of a channel script template. The appropriate script template is selected based upon the proximity of an CHANSCRIPT tag to the particular CHANNEL element in the URL.

A channel URL, as appears in script templates, is of the following form: mctp: //CDFid/ChanID Here, mctp specifies the use of the loadable transport protocol to resolve the URL and to invoke the scripting engine. "ICDFid" is the ID tag of the top-level CHANNEL element. It is used to select the correct CDF file. "ChanId" is the ID tag of the CHANNEL element for the subchannel within the CDF to be rendered. As a user navigates through the channel, he or she is effectively moving up and down through the CDF channel hierarchy accessing data files. At each level in the channel hierarchy, it is possible to associate a script template to display the channel content, which is usually a list of subchannels or available items.

The CHANSCRIPT tag identifies the script template to be used to render the current channel location in a way similar to how the ITEMSCRIPT tag identifies the script template to render data. The location of a CHANNEL element relative to a CHANSCRIPT determines which script template will be used to render the subchannel. The script template is identified by matching the ID value in the CHANSCRIPT element with the ID value of an ITEM element, that is, the ITEM for the script template, within the CDF.

CHANSCRIPT tags are children of CHANNEL elements. A CHANSCRIPT tag determines the script template to be used for the current channel and its subchannels. A CHANSCRIPT tag specified for a CHANNEL element supercedes any previously defined CHANSCRIPT value.

Thus, an inheritance model is used. When it is necessary to render a particular subchannel, the nearest CHANSCRIPT tag upward in the hierarchy is used to determine what script template should render the data. In the event that the appropriate script template is not available on the mobile device 18, a built-in script template 232 is used to render the channel as best it can.

SCRIPTING

The script template specifies the layout and behavior of HTML pages. Script segments are enclosed between the "<%" and "%>" or "<%=" and "%>" delimiter pairs. The second pair of delimiters entails special use and meaning in the script template. In each script segment, there must be at least one valid executable, or non-comment, statement. There must also be at least one scripting segment in the mcs file. In one embodiment, any empty script segment generates a syntax error. Scripting segments can be freely intermixed with standard HTML text, provided that the script-generated, HTML output has the valid syntax within the context of the standard HTML display code. Appendix A provides an example of a CHANNELSCRIPT and an ITEMSCRIPT. Appendix B is a description of a scripting environment for use in the present system.

Figure 8:
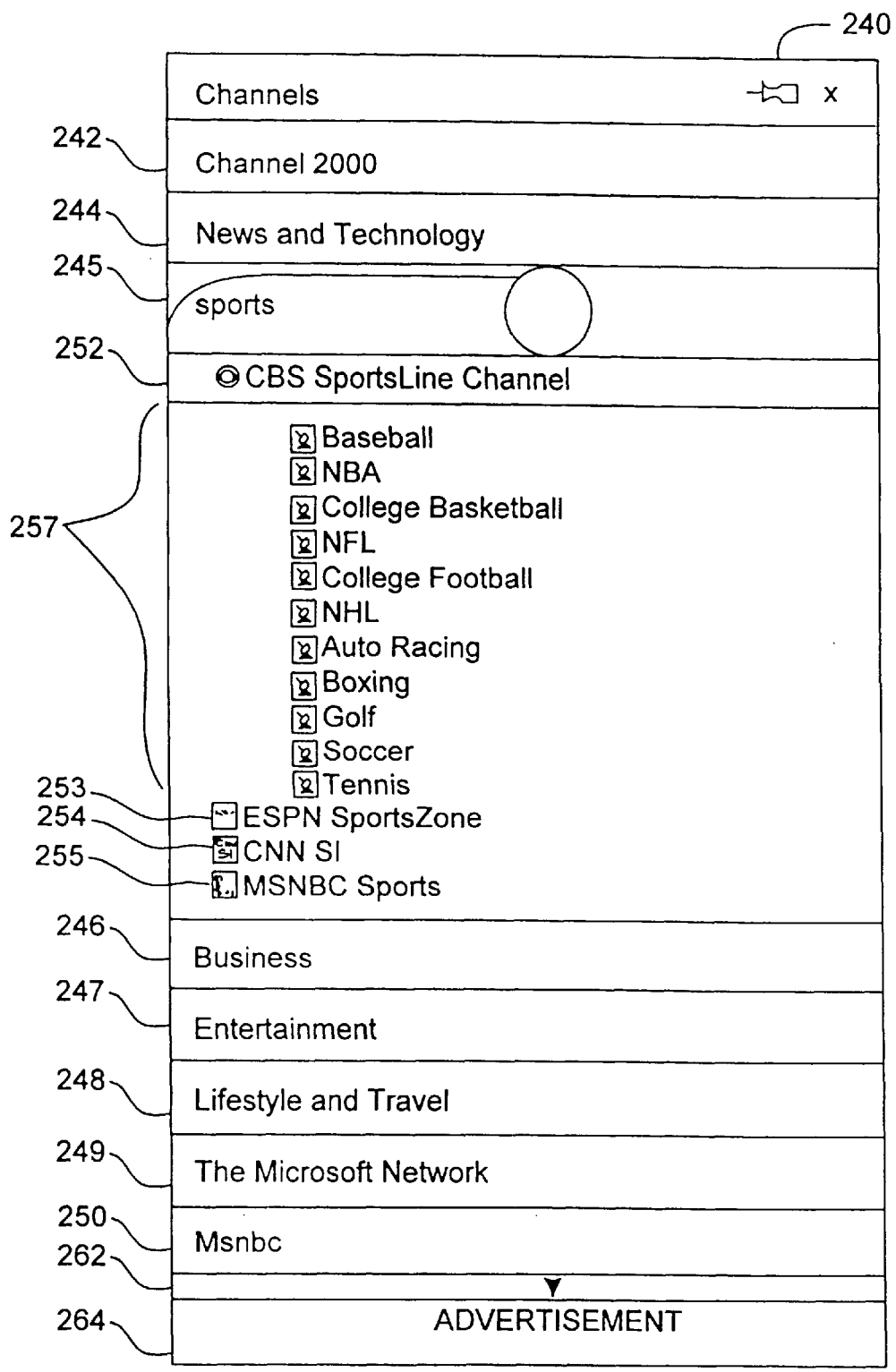
FIG. 8 is a diagrammatic illustration of a graphical user interface rendered by the present invention.

FIG. 8 illustrates an example of an index viewer user interface 240 for rendering content information using the CDF files 201, the script templates 204 and the data 202. The index viewer user interface 240 can cover the complete display 45 when the information is rendered, or alternatively, the index viewer user interface 240 can be a "pane" of a larger graphical user interface presented on the display 45.

In the exemplary embodiment of FIG. 5, the top-level channel is indicated at 242. The top-level channel 242 includes general subchannel categories, such as "News and Technology", "Sports", "Business", "Entertainment", "Life Style and Travel", "The Microsoft Network", and "MSNBC". Subchannels 244, 245, 246, 247, 248, 249 and 250 correspond to the first level subchannels "Test Subchannel 1" and Test Subchannel 2" shown in the example of Table 1. Each of the subchannels 244–250 lead to further subchannels and/or data items. In the example of FIG. 8, the subchannel 245 includes further subchannels 252, 253, 254 and 255. In this example, subchannel 252 includes yet further subchannels generally indicated at 257 which, when accessed, will display the latest article pertaining to the listed subject heading. An indicator button 260 can be provided to the user when additional information is present but not shown. In this example, the indicator button 260 indicates that additional subchannels to the top-level channel 242 are present. A portion 264 of the user interface 240 can be set aside for advertisements.

To display the content information of the top-level channel 242, the channel browser 218 (FIG. 6) accesses the loadable transport 220 in order to locate the CDF file for the top-level channel 242 in the stored CDF files 201. By examining the CDF file for the top-level channel 242, the loadable transport 220 determines which script file will be executed from the script templates 204 in order to render the titles of the subchannel 244–250 illustrated in FIG. 8. It should be noted that the titles of the subchannels 244–250 are not contained in the script file that is executed, but rather, form a part of the CDF file for the top-level channel 242. Thus, the script file used to render the top-level channel 242 examines the CDF file for the top-level channel 242 in order to generate the HTML page 224 as provided to the channel browser 218. This allows general script files to be used rather than specific script files for each portion of the information that is rendered. As discussed above, when a subchannel, such as subchannel 245, is rendered, a different script file can be called, or if one is not called, the script file used to generate the top-level channel 242 can be used. Again, when any of the subchannels 252–255 or 257 are to be rendered, the scripts executed will examine the CDF file for the top-level channel 242 in order to obtain relevant information that will be displayed as well as determine how the information is to be displayed in the hierarchy. Along with the script templates 204 and data 202, the CDF files 201 can be updated as desired.

Although the present invention has been described with reference to preferred embodiments, workers skilled in the art will recognize that changes may be made in form and detail without departing from the spirit and scope of the invention.

What is claimed is:

1. A computer readable medium including instructions readable by a computer which, when implemented, cause the computer to handle information from a server remote from the computer by performing steps comprising:

storing a content structure file, a data file and a script file on the computer, the data file including data indicative of the information and the script file including script information indicative of a desired form in which the data is to be rendered, the content structure file, data file and script file being independently received and stored by the computer;

reading the content structure file to ascertain which script in the script file is associated with data to be rendered;

retrieving the data from the data file and executing the associated script in the script file to render the data; and displaying the rendered data on a display controlled by the computer.

2. The computer readable medium of claim 1 wherein the content structure file includes references to data and scripts in a hierarchy.

3. The computer readable medium of claim 2 wherein reading the content structure file to ascertain which script in the script file is associated with the data to be rendered includes choosing the script as a function of the hierarchy.

4. The computer readable medium of claim 3 wherein the content structure file includes script tags associated with scripts in the script file, the script tags being in the hierarchy.

5. The computer readable medium of claim 4 wherein choosing the script file includes choosing a script referenced by a script tag in a higher portion of the hierarchy for data to be rendered in a lower portion of the hierarchy if there is no associated script tag for the data in the lower portion of the hierarchy.

6. The computer readable medium of claim 1 including instructions readable by a computer which, when implemented, cause the computer to handle information by performing steps comprising:

storing a preference on the computer file having information regarding data to be stored in the data file; and intermittently receiving updated data and reading the preference file to ascertain if the updated data is to be stored in the data file.

7. The computer readable medium of claim 6 wherein the content structure file includes preference tags associated with default preferences, and wherein storing a preference file includes reading the preference tags.

8. The computer readable medium of claim 7 including instructions readable by a computer which, when implemented, cause the computer to handle information by performing steps comprising:

changing the information in the preference file.

9. The computer readable medium of claim 1 wherein executing the script comprises rendering the data in a processor independent form.

10. The computer readable medium of claim 9 wherein the computer comprises a mobile device, and wherein storing the content structure file, data file and script file includes receiving the content structure file, data file and script file from a desktop computer.

11. The computer readable medium of claim 9 wherein executing the script comprises rendering the data in hypertext markup language (HTML) form.

12. The computer readable medium of claim 1 including instructions readable by a computer which, when implemented, cause the computer to handle information by performing steps comprising:

storing a first script file and a second script file on the computer; and wherein reading the content structure file to ascertain which script includes examining the first script file for the associated script and wherein executing includes executing another script from the second script file if the associated script is not found.

13. A method for displaying information from a server on a display of a computer remote from the server comprising:

storing a content structure file, a data file and a script file on the computer, the data file including data indicative of the information and the script file including script information indicative of a desired form in which the data is to be rendered, the content structure file, data file and script file being independently received and stored by the computer;

reading the content structure file to ascertain which script in the script file is associated with data to be rendered;

retrieving the data from the data file and executing the associated script in the script file to render the data; and displaying the rendered data on the computer's display.

14. The method of claim 13 wherein the content structure file includes references to data and scripts in a hierarchy.

15. The method of claim 14 wherein reading the content structure file to ascertain which script in the script file is associated with the data to be rendered includes choosing the script as a function of the hierarchy.

16. The method of claim 15 wherein the content structure file includes script tags associated with scripts in the script file, the script tags being in the hierarchy.

17. The method of claim 16 wherein choosing the script file includes choosing a script referenced by a script tag in a higher portion of the hierarchy for data to be rendered in a lower portion of the hierarchy if there is no associated script tag for the data in the lower portion of the hierarchy.

18. The method of claim 17 wherein executing the script comprises rendering the data in a processor independent form.

19. The method of claim 18 wherein executing the script comprises rendering the data in hypertext markup language (HTML) form.

20. The method of claim 18 wherein the computer comprises a mobile device, and wherein storing the content structure file, data file and script file includes receiving the content structure file, data file and script file from a desktop computer.

21. The method of claim 13 and further comprising:

storing a preference file on the computer having information regarding data to be stored in the data file; and intermittently receiving updated data and reading the preference file to ascertain if the updated data is to be stored in the data file.

22. The method of claim 21 wherein the content structure file includes preference tags associated with default preferences, and wherein storing a preference file includes reading the preference tags.

23. The method of claim 22 and further comprising changing the information in the preference file.

24. The method of claim 13 and further comprising storing a first script file and a second script file on the computer; and wherein reading the content structure file to ascertain which script includes examining the first script file for the associated script and wherein executing includes executing another script from the second script file if the associated script is not found.

* * * * *